Sept. 6, 1966  G. V. COLBY, JR  3,271,763
RADAR ALTIMETER

Filed Feb. 25, 1964  3 Sheets-Sheet 3

INVENTOR.
GEORGE V. COLBY JR.
BY
ATTORNEY

United States Patent Office 3,271,763
Patented Sept. 6, 1966

3,271,763
RADAR ALTIMETER
George V. Colby, Jr., Lexington, Mass., assignor to Laboratory for Electronics, Inc., Boston, Mass., a corporation of Delaware
Filed Feb. 25, 1964, Ser. No. 347,290
12 Claims. (Cl. 343—7)

This invention relates generally to terrain clearance indicators for aircraft and more particularly it is concerned with improvements upon a Doppler navigation system which enables it to provide height indications as well as navigational information. This application is a continuation-in-part of my co-pending application Serial No. 272,568, filed April 12, 1963, now abandoned, entitled, Radar Altimeter, and assigned to the same assignee as this application.

To overcome the shortcomings of conventional barometric altimeters for aircraft, various types of electronic systems have been devised for measuring height above ground. As is well known, such systems are based upon the principle of echo ranging which contemplates the use of various forms of transmitted waves. For example, in one type of height measuring system, a continuous amplitude modulated wave is transmitted. A requirement of this type of system at low altitudes, is that at least 80 db of isolation be provided between transmitter and receiver. Such a high degree of isolation can only be obtained through the use of separate transmitting and receiving antennas, and this makes the unit rather unwieldy from the standpoint of an aircraft environment. Another type of system which has been devised makes use of frequency modulated continuous waves. The major problem encountered with this type of system is that its accuracy is marginal. Pulse type systems have proved to be the most satisfactory when the first return, that is the shortest distance between the antenna and any obstacle within its looking angle, is of primary importance. This is not the case in ordinary usage, however, where it is an indication of height above the average level of the terrain that is desired.

In U.S. Patent No. 3,102,263, there is disclosed a Doppler navigation system for aircraft which operates on the principle that the frequency shift due to the Doppler effect may be utilized to produce an indication of the aircraft ground speed and drift angle. In this system, the signal to be transmitted is subject to a controlled gating action whereby a form of interrupted continuous wave is produced having a 50% duty cycle. In order to eliminate overlap between the times of occurrence of the transmitted waves and the times of arrival of the reflected waves, the transmitted signal is gated at a frequency which varies according to altitude. In other words, the pulse repetition frequency is varied such that returns from the ground are always received during the intervals between the times that waves are transmitted. It has now been found that reflected waves received under these conditions can be used for determining height above ground. Furthermore, height information which is obtained in this way can be used to control the gating of the transmitted waves so that the frequency at which the transmitted waves are interrupted, hereinafter referred to as the pulse repetition frequency or PRF, will be as required to produce the aforementioned condition of no overlap between the transmitted and received waves. Prior to the present invention, a conventional barometric sensor was relied upon to furnish height information for gating purposes which required correction for the average elevation of the terrain above sea level.

It is an object of the present invention, therefore, to provide a more practical type of terrain clearance indicator for use in aircraft.

A more specific object is to provide a highly accurate and reliable terrain clearance indicator which can be implemented with relatively simple circuitry suitable for an aircraft environment.

Another object is to provide a terrain clearance indicator as an accessory to a Doppler navigational system.

Still another object is to enhance the operating characteristics of a Doppler navigational system.

The novel features of the present invention together with further objects and advantages thereof will become readily apparent from the following detailed description of the accompanying drawings wherein a preferred embodiment is illustrated:

In the drawings, FIG. 1 is a block diagram of a Doppler navigational system adapted to auxiliary use as a terrain clearance indicator in accordance with the present invention.

In brief the present invention contemplates the use of a phase detector to measure the difference between the phase of the wave envelope transmitted by a Doppler radar system and the phase of its reflected counterpart. When the phase difference between these two envelopes is equal to 180 degrees, it will be shown that the envelopes of the received waves are precisely centered in the intervals between the transmitted wave envelopes so that no overlap occurs. When this phase difference is other than 180 degrees, an error signal is developed which is used to correct the PRF until the phase difference between the two envelopes is 180°. Under these conditions, the PRF becomes a function of the round trip distance from source to ground and back from which an indication of height above ground can be derived.

Figure 1:
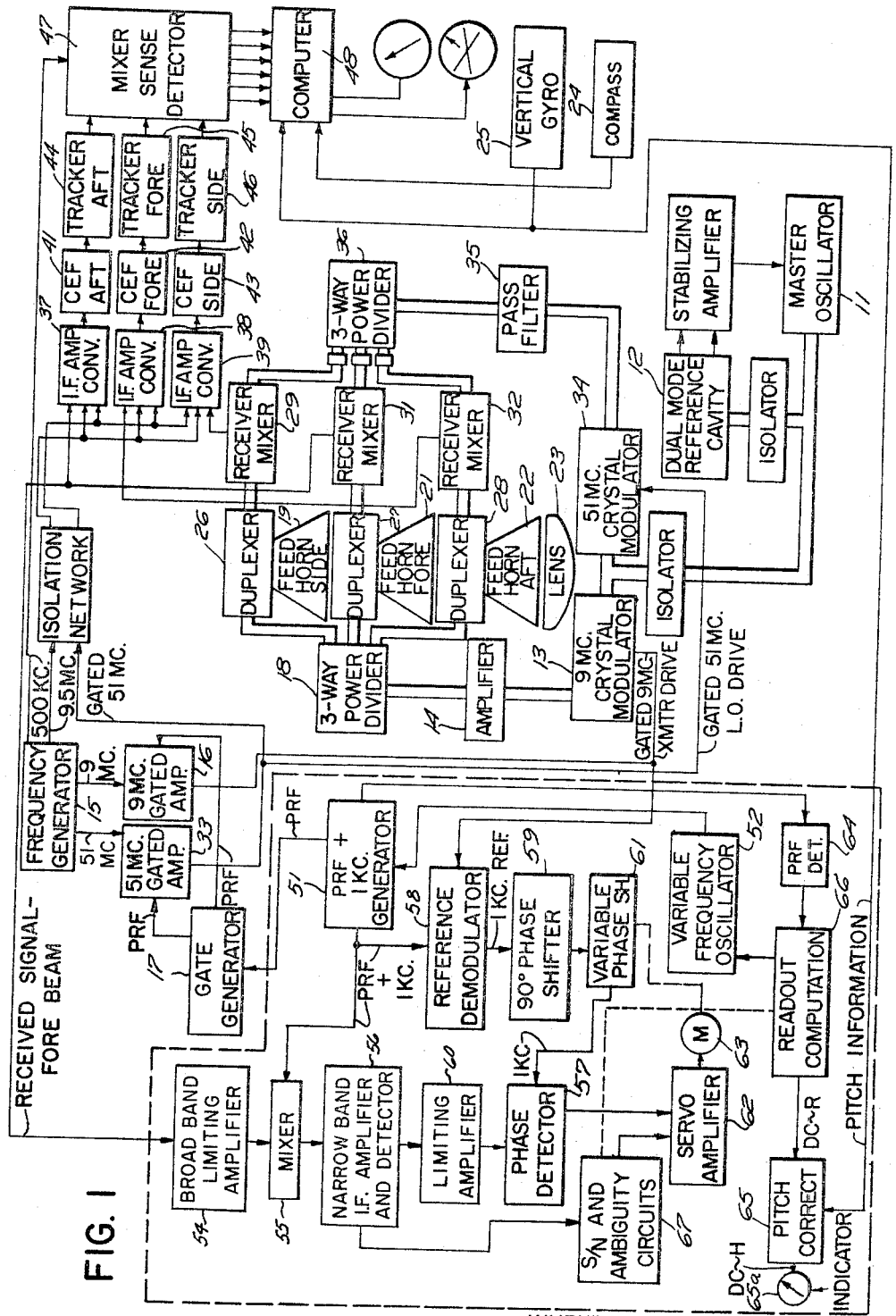

In FIG. 1 the apparatus of the present invention is shown enclosed in dotted lines and the relevant portion of the Doppler navigation system with which it cooperates, as disclosed in the aforementioned patent, is located outside the dotted lines. With reference first to the Doppler navigator itself, it will be observed that the frequency of operation, "$f$," is determined by a master oscillator 11 which is stabilized by means of a dual mode reference cavity 12. That is to say, a sample of the master oscillator signal is fed to the dual mode reference cavity 12, from which an error signal is derived to conform the oscillator frequency to the cavity resonance frequency. The master oscillator signal is side-stepped at a frequency of 9 megacycles by a crystal modulator 13 and fed to an amplifier 14. The 9 megacycle modulating signal is obtained from a frequency generator 15 and is subjected to the gating action of a gated amplifier 16 controlled by a gate generator 17. Gated amplifier 16 is effectively turned on and off by a signal from the gate generator 17 so that the form of the modulating signal which acts upon the master oscillator signal is that of an interrupted continuous wave. Amplifier 14 is tuned to pass only the sidestep frequency, and in particular the sum component resulting from the modulation of the master oscillator signal by the crystal modulator 13. Gate generator 17 thus serves to control the system PRF and the length of the transmitted pulse.

After amplification in amplifier 14, the signal to be transmitted is fed to a three-way power divider 18 which apportions the signal among three feed horns 19, 21, and 22. The energy from the feed horns is shaped by lens 23 (which preferably is a conventional Luneberg lens) into three distinct beams, one of which is tilted downwardly in the forward direction, another in the rearward direction and a third to the side. On the basis of returns from these three beams, components of motion of the aircraft in the lateral and vertical directions as well as the forward direction are obtained, and from these components a computation of speed and drift angle is made. The system also makes use of a compass 24 and vertical gyro 25 to take account of the attitude of the aircraft.

In the process of obtaining the speed and drift angle, signal returns resulting from reflections of the respective beams are passed by duplexers 26, 27, and 28 to corresponding receiver mixers 29, 31, and 32. The local oscillator signal for the mixers is synthesized from the master oscillator signal and a 51 mc. modulating signal. The latter is derived from frequency generator 15 and is gated by means of a gated amplifier 33, at the same rate as the 9 megacycle transmitter modulating signal. A standard frequency of 500 kc. is used in the frequency generator 15 for obtaining both the 51 and 9 megacycle signals through various multiplying and mixing operations so that the difference between the frequencies of these signals remains precisely fixed.

After gating, the 51 megacycle signal is fed to a 51 mc. crystal modulator 34 where it is used to modulate a portion of the master oscillator signal. The output from the 51 mc. crystal modulator 34 is passed to the receiver mixers 29, 31, and 32 by way of a pass filter 35 and another three-way power divider 36. Pass filter 35 serves to pass only that component of the modulator output corresponding to the sum of the master oscillator signal and the 51 megacycle modulating signal. In the mixers it is the difference frequency component with a frequency of 42 mc. which is used as an IF signal and by means of converter units 37, 38, and 39 the IF signals from the mixers are converted to a reference frequency of 500 kc. For this purpose a portion of the gated 51 megacycle signal from gated amplifier 33 together with a 9.5 megacycle signal from frequency generator 15 is supplied to these converter units.

Included in the signals from the converter units, along with the desired Doppler components, are 500 kc. components resulting from energy leakage into the receiver channels directly from the transmitting channel. Such leakage is due primarily to overlap of the transmitted and received wave envelopes resulting from the finite switching times inherent in the gating processes. Carrier elimination filters 41, 42 and 43 are employed to remove such components at 500 kc. from the received signal spectrum so that only the sidebands representing the Doppler shifts of the various components of the transmitted beams remain. That is to say, because the antenna beam widths are finite, the Doppler return consists of a spectrum of frequencies which vary with the angle of the transmitted beam relative to the direction of motion. The greater the velocity of motion, the greater is the spectrum of Doppler frequencies.

It is the function of trackers 44, 45, and 46 to produce a single frequency corresponding to the power center of the Doppler spectrum evidenced by the signals from the carrier elimination filters 41, 42, and 43. As described in detail in the aforementioned co-pending application, trackers 44, 45, and 46 make use of oscillators arranged in servo loops to track the power center of the Doppler spectrum.

Signals proportional to the magnitude and sense of the individual components of velocity of the aircraft and their sense are obtained through the use of a mixer sense detector 47 in which the Doppler signals from the trackers 44, 45, 46 are appropriately combined. Finally, the desired indications of ground speed and drift angle are computed from these velocity components in a computer 48 which is also provided with signals from a vertical gyro 25 and a compass 24 in order to compensate for pitch, roll and yaw of the aircraft.

According to the present invention, gate generator 17, which controls the system PRF, is synchronized by a frequency generator 51 whose output frequency in turn is synthesized from a variable frequency signal from variable frequency oscillator 52. In other words, the frequency of the variable frequency oscillator 52 serves to determine the PRF. To control the variable frequency oscillator 52, there is obtained from the receiver channel associated with the forward beam, a sample of the IF signal which is fed to a broad band limiting amplifier 54. Reliance is here placed upon the forward beam for supplying a signal representing altitude, but it should be noted that any of the beams could be used. The function of broad band limiting amplifier 54 is, as described in my co-pending application, Serial No. 280,949 filed March 16, 1963, entitled "Doppler Radar System," now U.S. Patent No. 3,234,548, to prevent any leakage signal from the transmitter from capturing the altitude computing circuitry to be described. Such leakage is primarily due to a slight overlap between the transmitter and local oscillator "on" times due to the fact that switching cannot be accomplished instantaneously. With limiting, however, as provided by broad band limiting amplifier 54, the effect of the leakage is reduced to a point where it can be readily compensated for.

Figure 2:
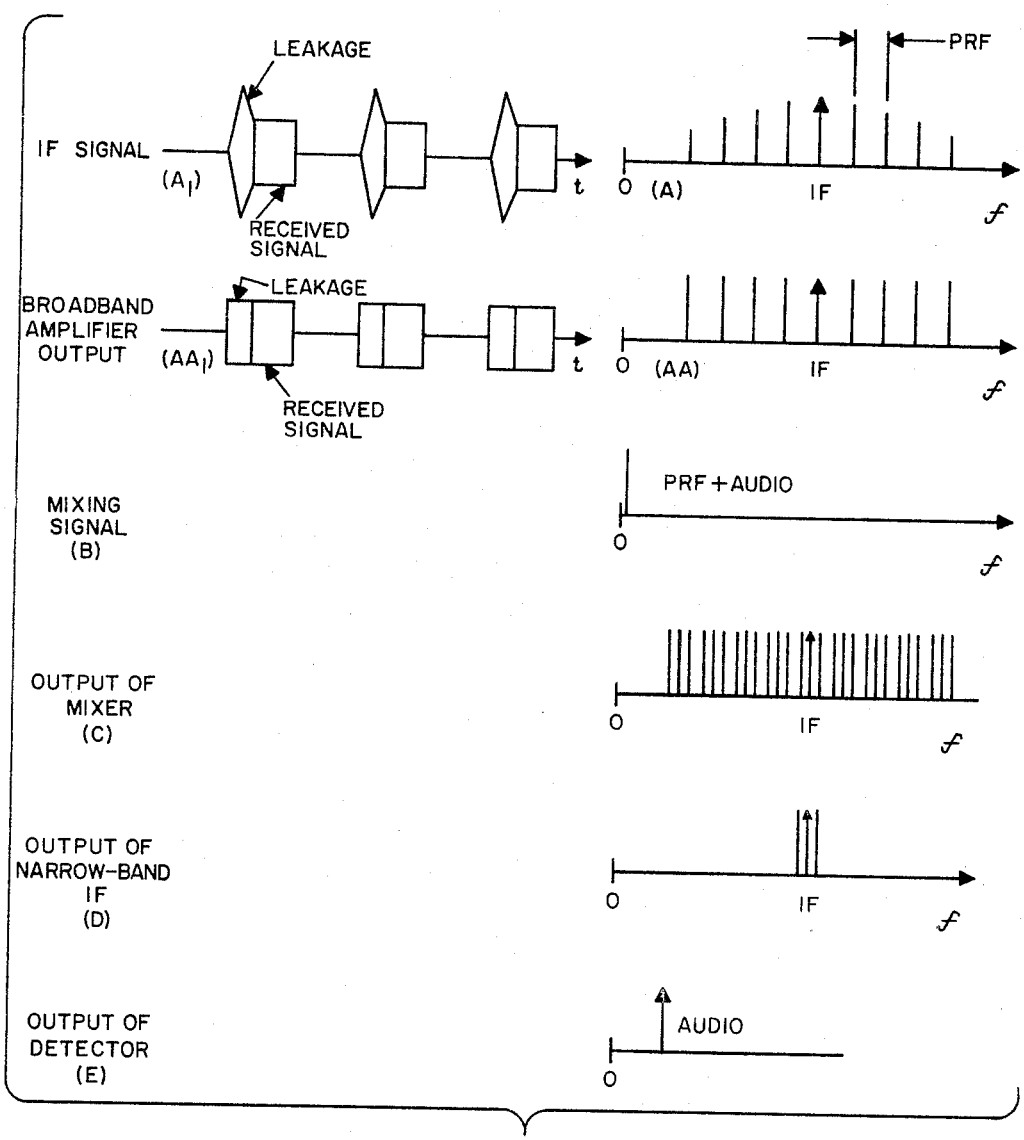
FIG. 2 is a family of graphs illustrating the spectral components of certain of the signals that are present in the system of FIG. 1.

The sample IF signal from the forward beam receiver channel is represented spectrally in graph (A) of FIG. 2 and, as a function of time, in graph ($A_1$). The output signal of the broad band limiting amplifier 54 is represented spectrally and, as a function of time, in graph ($AA_1$). As shown in FIG. 2, the IF signal consists of a 42 megacycle carrier accompanied by sidebands displaced from the carrier at intervals corresponding to the PRF. Broad band limiting amplifier 54 in turn is coupled to a mixer 55 which is supplied with a signal having a frequency 1 kc. higher than the PRF. This signal which is obtained from the $PRF+1$ kc. generator 51 is shown in FIG. 2 (B). Graph (C) of FIG. 2 illustrates the resultant of the mixing process in mixer 55 which is seen to have a spectral distribution like that shown in graph (AA) with the addition of components separated in frequency by 1 kc. from the components in graph (AA). By means of a narrow band IF amplifier and detector 56, only the 42 megacycle carrier and its associated 1 kc. components are selectively amplified and detected as shown in graphs (D) and (E), the final result being an audio signal of 1 kc. whose amplitude is limited by a limiting amplifier 60 and whose phase corresponds to the phase of the received signal envelope. Limiting amplifier 60 is adapted to insure that this signal has a substantially constant amplitude even at very low altitudes.

To sense the phase of this signal, there is provided a phase detector 57 together with means for obtaining a 1 kc. phase reference signal. The reference signal is derived from a reference demodulator 58 which is provided with a sample of the transmitted signal from generator 15 by way of gated amplifier 16 together with a signal from the $PRF+1$ kc. generator 51 at a frequency 1 kc. higher than the PRF. Reference demodulator 58 is adapted to detect the resulting 1 kc. difference component and the phase of this component serves to represent the phase of the envelope of the transmitted signal.

As previously stated, the desired operating condition in the normal mode of operation is obtained when the envelopes of the transmitted and received signals are displaced by 180 degrees. To produce this condition, the phase of the reference signal from the reference demodulator 58 is shifted approximately 90 degrees in phase shifter 59 and then applied by way of a variable phase shifter 61 to phase detector 57. In the normal mode of operation of the system, variable phase shifter 61 does not introduce an additional phase shift. Thus, any phase difference between the envelopes of the 1 kc. signals into the phase detector 57 other than 90° results in a D.C. error signal being produced which reflects in magnitude and sense, the magnitude and sense of the deviation from the desired phase condition. This signal controls the operation of a servo amplifier 62 and servo motor 63 which in turn controls the frequency of the variable frequency oscillator 52. As a result, then, the frequency of the latter will increase or decrease as the case may be, depending upon the sense of the initial PRF deviation and the system PRF will vary until the desired condition is obtained and a null signal is produced by the phase detector 57.

To obtain an indication of height above ground based on the PRF, a sample of the PRF is obtained from $PRF+1$ kc. generator 51 and is converted to a D.C. signal of proportional amplitude in a PRF detector 64. After compensation for pitch and attitude in a pitch correction unit 65 this signal is applied to an indicator 65a which is calibrated in terms of terrain clearance. This portion of the system will be described more in detail in connection with FIG. 3.

At a height above ground of approximately 2,000 feet, a practical upper limit is placed on the PRF by the fact that proper switching between transmitting and receiving becomes difficult to achieve. Therefore, in accordance with the invention, the positional range of the servo motor 63 (which is effective to control the frequency of the variable frequency oscillator 52) is fixed, so that the PRF remains constant in the region below 2,000 feet. As soon as this condition obtains, servo motor 63 operates instead upon a variable phase shifter 61 which acts to create an additional phase shift of the reference signal from the reference demodulator 58. By this means, a null signal is produced in a manner analogous to that which results from a change in the PRF, and the amount of such phase shift is then taken as a measure of changes in height below 2,000 feet. This measurement process is accomplished functionally in a readout computation unit 66 which serves to appropriately modify the D.C. signal from PRF detector 64. S/N (signal to noise) and ambiguity circuit 67 simply provides a bias voltage which is adapted to drive servo motor to a point approximating that which is reached at maximum altitude in the event of a loss of signal.

Figure 3:
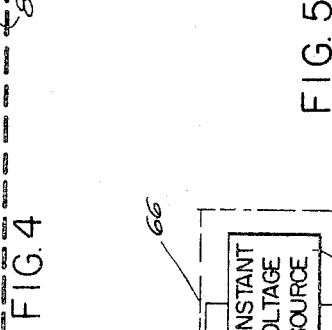
FIG. 3 is a graph illustrating the timing relation between the envelopes of transmitted and received waves in the system of FIG. 1.

The operations involved in the readout computation may best be understood with reference to FIG. 3. In FIG. 3 the envelopes of the transmitted waves are shown in idealized form along the axis designated A and the received wave envelopes along the axis designated B. When the aircraft is at or above a predetermined height, such as 2,000 feet as aforementioned by way of example, there will be no overlap in the times during which waves are transmitted and received since the variable frequency oscillator is under control of the servo motor 63 and the PRF is, therefore, at such a value that the received wave envelopes are substantially centered between the transmitted wave envelopes. In other words, the angle $\phi$ in FIG. 3 is very nearly zero. In this regard, it will be recalled that actually a small fixed amount of overlap exists between the transmitter and local oscillator "on" times so that the IF signal likewise overlaps the transmitter signal slightly due to leakage. By virtue of the limiting action of amplifier 54, however, the error introduced in this way is a fixed error and can be compensated for by appropriate adjustment of phase shifter 59 and gated amplifier 33. The former is adjusted so that the phase center of the local oscillator signal is displaced from the phase reference signal by precisely 90° and the latter is adjusted so that the same relation exists between this phase center and the center of the period of overlap between the transmitter and local oscillator signals.

Accordingly, this effect will be neglected in the description of the operation which follows. Now when the height of the aircraft is less than 2,000 feet then the servo motor 63 is no longer effective to vary the PRF and overlap occurs between the received wave envelopes (as distinguished from the IF signal which includes leakage) and the transmitted wave envelopes. Because of the gating of the local oscillator signal, however, the overlapping or hatched portion of each received wave envelope does not appear in the IF signal. As a result, the angle $\phi$ sensed by the phase detector 57 will be seen to correspond to one half the phase difference $(\pi-\theta)$ between the trailing edge of the envelope of the transmitted pulse and the leading edge of the envelopes of the reflected pulse arriving back at the aircraft. To put it another way, the phase difference between the leading edges of both the transmitted and reflected wave envelopes, designated by the angle $\theta$ in FIG. 3 is equal to $(\pi-2\phi)$.

Since $$\theta = 2\pi(PRF)t$$

where "$t$" equals the round trip time of electromagnetic energy from the aircraft to the ground, it may be shown that the height of the aircraft, $h$, may be determined by solving the following equation:

$$h = K\left(\frac{1}{PRF}\right)\left(1 - \frac{\phi}{\pi/2}\right)$$

where K is a constant depending on the velocity of propagation of electromagnetic energy and the angular difference between the direction of propagation of such energy and the vertical axis through the aircraft. The solution of this formula obviously involves the following operations:

(a) a determination of the value of $1/PRF$, which value is a variable only when $h$ is greater than 2,000 feet;

(b) a determination of the value of $$\left(1 - \frac{\phi}{\pi/2}\right)$$

which value is a variable only when $h$ is less than 2,000 feet;

(c) a determination of the value of the constant K; and (d) multiplication of the foregoing quantities.

Figure 4:
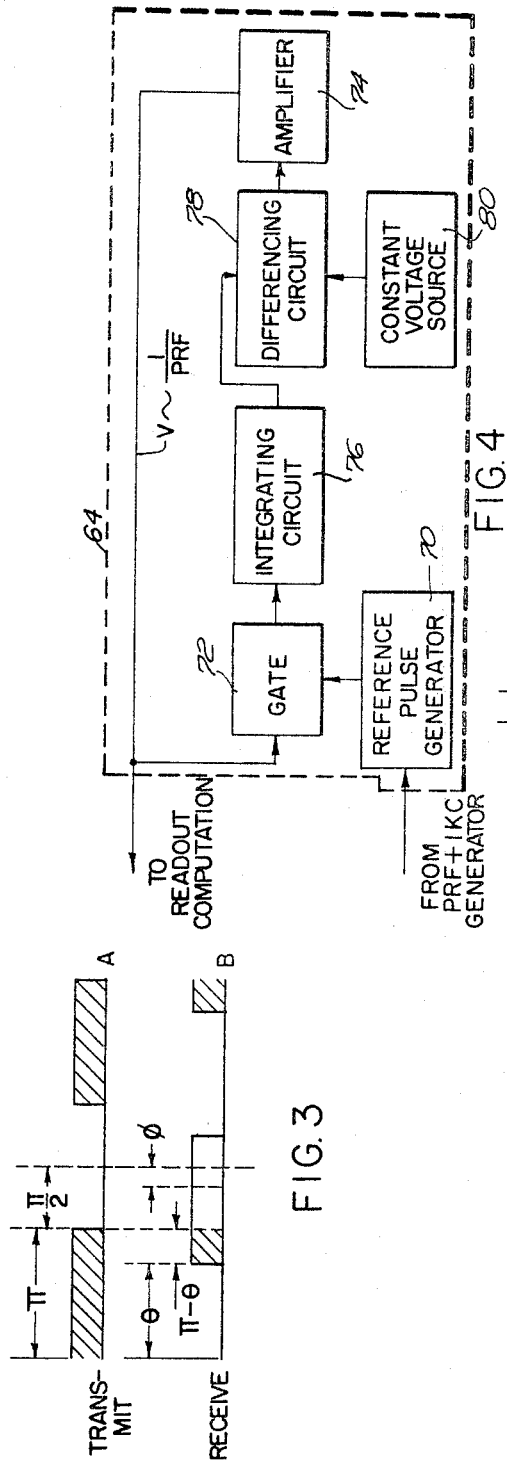
FIG. 4 is a block diagram illustrating the frequency detector of FIG. 1 in more detail and FIG. 5 is a block schematic diagram of the height computation and pitch correction units of FIG. 1.

Operation (a) is carried out in the PRF detector 64. With reference now to FIG. 4, where the PRF detector 64 is shown in detail, it will be observed that a sample of the PRF signal from the $PRF+1$ kc. generator 51 is used to synchronize a reference pulse generator 70. This unit provides pulse signals of constant duration at the same rate as the PRF. These pulse signals enable an AND gate 72 to pass a D.C. signal obtained from an amplifier 74. To produce this D.C. signal which is designated "V" in FIG. 4, the gated D.C. signal passing through the AND gate 72 is integrated in an integrating circuit 76 and the voltage resulting from the integration process is compared, in a differencing circuit 78, with a constant reference voltage furnished by a voltage source 80. The output of the differencing circuit 78 is amplified in amplifier 74 to produce the voltage "V."

In operation, an increase in PRF causes an increase in the amount of voltage developed by the integrating circuit 76. This is reflected in a change in the voltage supplied to the differencing circuit 78 and to the amplifier 74. The sense of the change is such that the voltage "V" decreases as the PRF increases. By virtue of this relation and the feed back arrangement employed the value of the voltage "V" becomes a substantially linear function of the inverse of the PRF.

Figure 5:
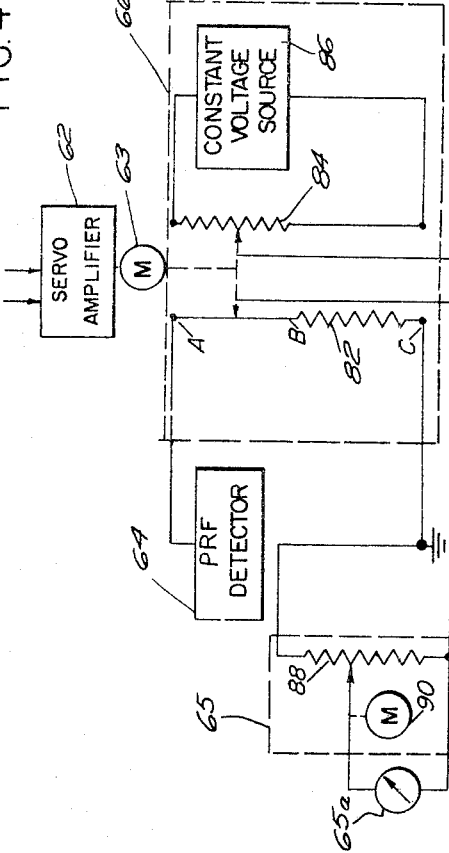

Operation (b) and a portion of operation (d) in the process of solving the foregoing equation are carried out as shown in FIG. 5. Referring now to FIG. 5, it may be seen that the output of the PRF detector 64 is applied to terminal "A" of a potentiometer 82 controlled by the servo motor 63. The potentiometer 82 comprises a low resistance section A–B and a high resistance section B–C. When the movable contact of the potentiometer 82 is in the low resistance section A–B (corresponding to the situation when the aircraft is above 2,000 feet) the voltage at its movable contact is substantially equal to the output voltage of the PRF detector 64. In other words the voltage at the movable contact of the potentiometer is proportional to 1/PRF. There is also a potentiometer 84 which is connected across a constant voltage source 86 and which is driven in tandem with the potentiometer 82. The output voltage from potentiometer 84 is used to control the PRF so long as the movable contact of potentiometer 82 is positioned in section A–B. When, however, the movable contact of the potentiometer 82 is driven into the high resistance section BC, the voltage at the movable contact of the potentiometer 84 goes to a fixed value, with the result that the PRF remains fixed and so does the voltage at the terminal A. Under these conditions, the voltage at the movable contact of the potentiometer 82, becomes a function of the position of this contact within the range defined by the high resistance section BC. With respect to ground, the voltage (E) at the movable contact of the potentiometer 82 may be expressed as:

$$E = E_0(1-x)$$

where $E_0$ equals the voltage at terminal A and $x$ equals the ratio of the resistance of the high resistance section from point B to the movable contact to the total resistance of the high resistance section.

It will be recognized immediately that the voltage E is an analogue of the term $$\left(1 - \frac{\phi}{\pi/2}\right)$$

of the equation to be solved. In passing also it should be noted that the potentiometer 82 is shown here as a part of the readout computation unit 66. In a practical circuit, however, the potentiometer 82 could be incorporated in the variable phase shifter 61, as described in my application entitled Phase Measuring Apparatus, Serial No. 272,628 filed April 12, 1963 and assigned to the same assignee as this invention.

The voltage at the movable contact of potentiometer 82 is led to the high side of a potentiometer 88. Thus the voltage across the potentiometer 88 is an analogue of either $$\frac{1}{PRF} \text{ or } \left(1 - \frac{\phi}{\pi/2}\right)$$

depending on the position of the movable contact of potentiometer 82. The movable contact of the potentiometer 88 is controlled by a servo motor 90 which is responsive to an error signal derived in a conventional manner (not show) from the vertical gyro 25. Thus, the voltage at the movable contact of potentiometer 88 represents the solution of the equation with a correction for pitch angle of the aircraft.

It will be evident to those having skill in the art that many modifications may be made in the preferred embodiment just described without departing from my inventive concepts. For example, it is obvious that the antennas could be mounted on a stable platform, thereby obviating the necessity for any pitch correction. Further, even though the present invention has been described in connection with a Doppler navigation system, it will be appreciated that the principles of the invention are equally applicable to a height indicator system having separate transmitting and receiving apparatus to provide range signals. Conversely, the invention has been shown to have utility in a Doppler navigation system apart from providing height indications. Therefore, the invention should not be deemed to be limited to the details of what has been described herein by way of example, but rather it should be deemed to be limited only by the scope of the appended claims.

What is claimed is:
1. A terrain clearance indicator for aircraft comprising:
   (a) means to produce interrupted continuous waves of electromagnetic energy and to transmit a beam of said waves towards the earth;
   (b) receiving means to receive echoes of said waves reflected from the earth;
   (c) means connected to said receiving means to provide an output signal as a function of the phase relation between samples of the envelopes of the transmitted and received waves;
   (d) and variable phase shifting means responsive to said output signal to vary the phase of one of said samples of the envelopes of said transmitted and received waves to produce a predetermined phase relationship between the samples of the envelopes of said received and transmitted waves.

2. A terrain clearance indicator for aircraft comprising:
   (a) means including an antenna to produce interrupted continuous waves of electromagnetic energy and to transmit a beam of said waves towards the earth,
   (b) receiving means including said antenna to receive echoes of said waves reflected from the earth; phase sensing means connected to said receiving means to generate an output signal as a function of the phase relation between the envelopes of the transmitted wave and the received wave,
   (c) means responsive to said output signal to vary the frequency at which said waves are interrupted so as to produce a predetermined phase relation between the envelopes of the transmitted and received waves,
   (d) and means to provide an indication of terrain clearance as a function of the frequency of interruption of said waves.

3. A terrain clearance indicator for aircraft comprising:
   (a) means to produce interrupted continuous waves of electromagnetic energy and to transmit a beam of said waves towards the earth,
   (b) means to sense the phase relation between the envelopes of the transmitted and received waves and to produce an error signal representing deviations from a predetermined phase relation,
   (c) servo means to control the frequency of interruption of said waves in response to said error signal so as to maintain said predetermined phase relation;
   (d) means to provide an indication of terrain clearance as a function of the frequency of interruption of said waves;
   (e) means to limit the range of control of said servo means and means to produce an error correction signal outside said range representing deviations from said predetermined phase relation, and means to modify the indication of terrain clearance as a function of said correction signal.

4. A terrain clearance indicator as claimed in claim 3 wherein said means to produce interrupted continuous waves of electromagnetic energy includes a master oscillator to produce a signal whose frequency approximates that of the waves to be transmitted;
   (a) a frequency generator to produce a modulating signal whose frequency is substantially less than that of the waves to be transmitted;
   (b) means including a variable frequency oscillator to periodically interrupt said modulating signal;
   (c) means to combine said modulating signal and said master signal;
   (d) and means to select a predetermined frequency component of the signal resulting from the combination of said modulating signal and said master signal for use as the transmitted waves.

5. A terrain clearance indicator as claimed in claim 4 including:
   (a) means to produce a second modulating signal in synchronism with said first-mentioned modulating signal,
(b) means to periodically interrupt said second modulating signal at the same frequency as said first modulating signal,
(c) means to combine said modulating signal with a sample of said master signal;
(d) means to select a predetermined frequency component of the signal resulting from the combination of said modulating signal and said sample of said master signal for use as a local oscillator signal;
(e) and means to prdouce an intermediate frequency signal in response to said local oscillator signal and the received waves.

6. A terrain clearance indicator as claimed in claim 5 wherein said phase sensing means includes:
(a) means to derive from said intermediate frequency signal, a first audio signal whose phase is representative of the phase of the envelope of the received waves;
(b) means to derive from said frequency conmponent for use as the transmitted wave, a second audio signal whose phase is representative of the phase of the envelope of the transmitted waves,
(c) and a phase detector to detect the phase relation between said audio signals and to produce an error signal representing deviations from a 180° phase relation thereof.

7. A terrain clearance indicator as claimed in claim 6 wherein said means to derive said audio signal includes first amplifier means to limit the amplitude of said intermediate frequency signal.

8. A terrain clearance indicator as claimed in claim 7 wherein said means to derive said first audio signal further includes:
(a) means to generate a signal whose frequency is displaced from the frequency at which said modulating signals are interrupted by an amount corresponding to the frequency of said first audio signal;
(b) mixer means coupled to said first amplifier means to combine said signal with the intermediate frequency signal of limited amplitude;
(c) second amplifier means coupled to said mixer means to select from said combination with said intermediate frequency signal of limited amplitude only the signal components whose frequencies are within a relatively narrow band centered about said intermediate frequency;
(d) and detector means associated with said second amplifier means to detect said first audio signal.

9. A terrain clearance indicator as claimed in claim 8 including third amplifier means to limit the amplitude of said first audio signal.

10. A terrain clearance indicator according to claim 9 wherein:
(a) said servo means includes a servo motor responsive to said error signal; and,
(b) said means to limit the control range thereof and said means to produce an error correction signal outside said range includes:
(1) A movable frequency control element operatively coupled to said servo motor over a limited positional range; and,
(2) A movable phase shifting element operatively coupled to servo motor outside said range for shifting the phase of one of said audio signals.

11. In a Doppler navigation system for aircraft the combination comprising: means to produce interrupted continuous waves of electromagnetic energy and to transmit a beam of said waves towards the earth; means to receive echoes of said waves reflected from the earth; means to obtain velocity signals as a function of the Doppler shift in the frequency of said waves:
phase detector means to generate an output signal as a function of the phase difference between the envelopes of the transmitted and received waves; and,
means responsive to said output signal to vary the frequency at which said waves are interrupted until said phase difference is approximately equal to 180°.

12. The combination according to claim 11 including means to disable said variable frequency means when the frequency at which said waves are interrupted reaches a predetermined maximum.

References Cited by the Examiner

UNITED STATES PATENTS

| | | | |
|---|---|---|---|
| 1,585,591 | 5/1926 | Lowy | 343—13 |
| 2,485,583 | 10/1949 | Ginzton | 343—13 |
| 2,546,973 | 4/1951 | Chatterjew et al. | 343—7.5 |
| 3,191,171 | 6/1965 | Zuefeldt et al. | 343—7 |

CHESTER L. JUSTUS, *Primary Examiner.*

T. H. TUBBESING, *Assistant Examiner.*